July 24, 1923.

G. R. BARKSDALE ET AL

1,462,896

AUTOMATIC ROVING CHECK

Filed Oct. 28, 1922

G. R. BARKSDALE ET AL

1,462,896

AUTOMATIC ROVING CHECK

Filed Oct. 28, 1922

Patented July 24, 1923.

1,462,896

UNITED STATES PATENT OFFICE.

GEORGE R. BARKSDALE AND PAUL B. WILSON, OF GREENWOOD, SOUTH CAROLINA; SAID WILSON ASSIGNOR TO SAID BARKSDALE.

AUTOMATIC ROVING CHECK.

Application filed October 28, 1922. Serial No. 597,661.

*To all whom it may concern:*

Be it known that we, GEORGE R. BARKSDALE and PAUL B. WILSON, both citizens of the United States of America, and residents of Greenwood, in the county of Greenwood and State of South Carolina, have jointly invented a new and useful Automatic Roving Check, of which the following is a specification.

Our invention relates to improvements in roving checks for spinning-frames and similar machines, and resides in means for arresting the motion of the first drawing roll, balanced mechanism for operating said means, said mechanism being subject normally to the control of the sliver, roving, or thread, means, associated with the stopping and starting mechanism for the moving parts of the spinning-frame or machine, for controlling said first-named mechanism when said moving parts are stopped and started, and means to position the thread guide out of the way during the doffing operation, together with such other parts and members as may be necessary or desirable in order to render the check complete and serviceable in every respect, all as hereinafter set forth.

As is well understood, devices of this character are employed for the purpose of preventing the waste of roving or damage to the rolls when the threads break between the rolls and the bobbins upon which the roving is wound, and the primary object of our invention is to produce a comparatively simple, sensitive, reliable, and efficient check, whereby the thread or roving is broken between the first and second drawing rolls whenever the normal and ordinary travel or movement of such roving is interfered with or interrupted by reason of its breaking between the third drawing roll and the associated bobbin, or between the second and third drawing rolls, and the aforesaid waste and damage are prevented. In this check the rotation of the first drawing roll is automatically arrested as soon as the roving breaks, and further feeding of the roving from the receiving to the delivery side of the spinning-frame or machine is prevented, and consequently piling up of the roving and entanglement thereof are prevented. It is estimated that a saving of approximately ninety per cent of the lap waste is effected through the use of our check, and that a further saving of approximately eighty to eighty-five per cent of the expense connected with leather-covered rolls is also effected.

Another object is to provide a check which so thoroughly safeguards the passage, on the delivery side of the machine, of the roving, that an increased production of the machine results, and more machines can be attended to by a single operator. This last is especially important, because it is thereby made possible to distribute the help and keep all of the machines running, as might not otherwise be possible, especially when the mill is short of help.

It is a well-known fact that the spinning room is continually behind the weave room, which necessitates running the spinning frames over time. Spinning frames equipped with this roving check may be kept running through the noon hour and at other periods when the help is absent.

Increased production is also due to the fact that the leather-covered rolls are prevented from being damaged in a machine equipped with this roving check, so that there is no lost time incident to replacing damaged covers with new covers.

A further object is to provide a check, of the character described, which is normally controlled by the roving to retain the stop member of the check, for the first drawing roll, in inactive position, but which, as soon as said roving breaks, causes said stop member to lock said roll against rotation; which locks said stop member in inactive position when the machine is stopped, and gradually or progressively releases said stop member when the machine is started, so as to avoid locking said roll and causing the roving to break; and which can be operated to throw up the thread-guide when it is required to do so for doffing, and retain said guide in raised position during the doffing operation.

Still another object is to provide the check with means for causing the aforesaid locking member for the first drawing roll to be held in inactive position relative to said roll, while the broken ends of the roving are being twisted together and united.

Other objects and advantages will appear in the course of the following description.

A preferred embodiment of our invention, whereby we attain the objects and secure the advantages of the same, is illustrated in the accompanying drawings, and we will proceed to describe said invention with reference to said drawings, although it is to be understood that the form, construction, arrangement, etc. of the parts in various aspects are not material and may be modified without departure from the spirit of the invention.

In the drawings, in which similar reference characters designate similar parts throughout the several views.

A spinning-frame or similar machine comprises a large number of what may be termed roving units, as is well understood, but it is sufficient to illustrate and describe but one of such units, and this course in the main is followed in the present case.

We will briefly mention the old parts and members with which the present invention is directly connected and associated, and then describe in detail the new parts and members, dealing first with the construction illustrated in the first ten views and then taking up the modifications illustrated in the remaining views.

Figure 1:
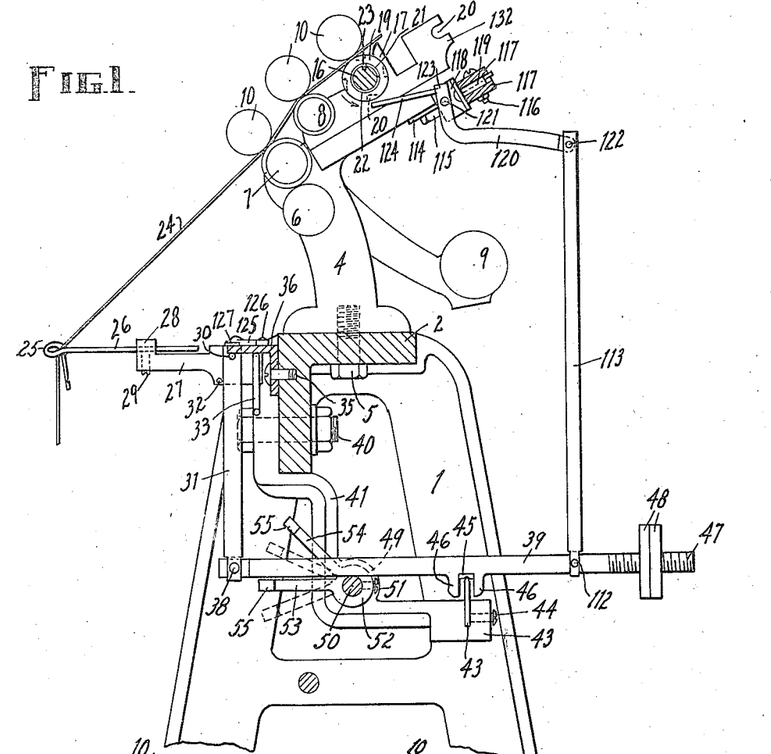
Figure 1 is a side elevation, with some parts in section, of an automatic roving check which embodies a practical form of our invention as aforesaid, so much of a spinning-frame, or more or less similar machine, as is necessary for the application and a clear understanding of the invention appearing in this and other views.
Figures 2, 3:
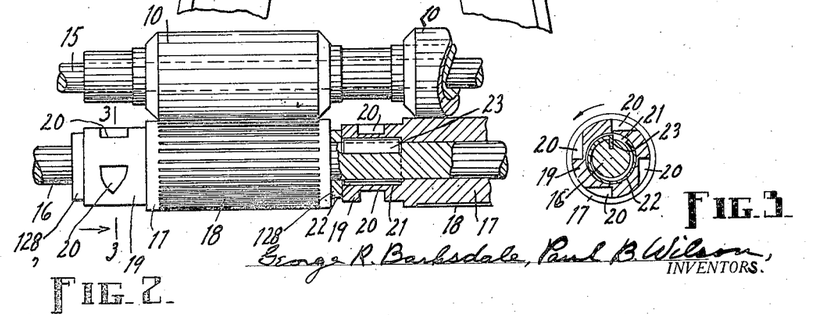
Fig. 2, a side elevation of the first drawing roll and the leather-covered roll above, and a central, longitudinal section through another first drawing roll on the same shaft and immediately adjacent to that first mentioned, and a fragment of another leather-covered roll on the same shaft with that first mentioned, the second leather-covered roll being in contact with the drawing roll which is in section.
Fig. 3, a cross section through said first-named first drawing roll and its shaft, taken on lines 3—3, looking in the direction of the associated arrow, in Fig. 2.
Figures 8, 9:
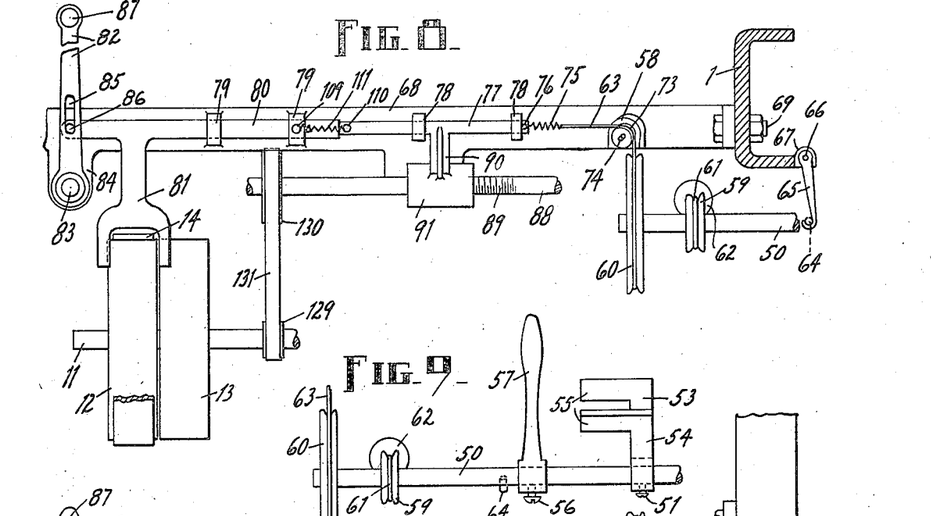
Fig. 8, a top plan of the starting and stopping mechanism for the machine, and of connected and associated parts and members.
Fig. 9, a top plan of certain of the parts and members illustrated in the preceding view, and of arms mounted on the portion of the rock-shaft therein shown.
Figures 10, 11, 12:
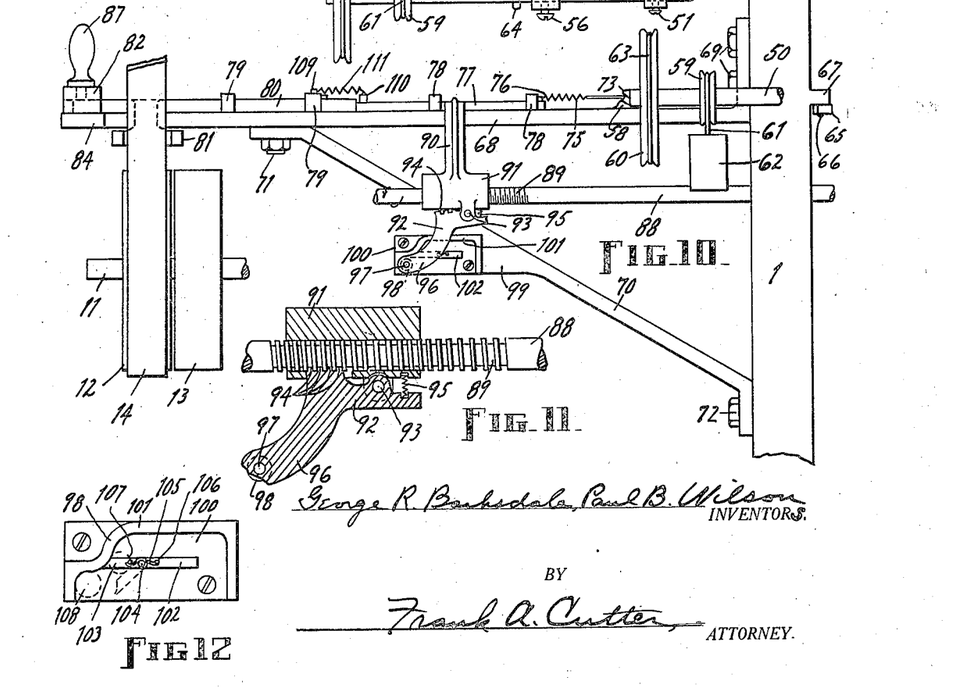
Fig. 10, a rear elevation of the mechanism and parts and members shown in Fig. 8.
Fig. 11, an enlarged sectional detail of certain of the aforesaid parts and members.
Fig. 12, an enlarged rear elevation of the cam plate which appears in Fig. 10.

A portion of one of the uprights of a spinning frame is represented at 1 in each of Figs. 1 and 2, and a portion of a second and adjacent upright is represented at 1 in each of Figs. 8 and 10. Connecting these two uprights at the top is an angle-iron 2, and mounted on said angle-iron is a stand 4, the same being bolted at 5 to the angle-iron. In practice there is a plurality of stands like the stand 4, and a plurality of saddles, such as that represented at 132, and they support shafts for scavenger rolls, third drawing rolls, and second drawing rolls, one of each of which rolls is respectively represented at 6, 7, and 8. At 9 is represented a counterweight for the scavenger roll 6. A leather-covered roll 10 is provided for each drawing roll 7 and 8, and there is a third leather-covered roll 10 behind and at a higher elevation than the leather-covered roll 10 which is associated with the drawing roll 8. A short length of the main driving shaft of the machine appears at 11 in Figs. 8 and 10, and therein are shown also a pulley 12 which is secured to and a pulley 13 which is loosely mounted on said shaft. A portion of a driving belt is represented at 14, the same being on the pulley 12, but adapted to be shifted onto the pulley 13 and back again onto the pulley 12.

Each of the leather-covered rolls 10 is mounted on a shaft, such as that shown in part at 15 in Fig. 2, the bearing supports for such shafts not being represented. The construction and operation of these rolls are well understood so that no detailed explanation in connection with the same is necessary.

A shaft for a first drawing roll 17 is journaled in the saddles, one of which appears at 132, and this drawing roll and the third leather-covered roll 10 mentioned above are in contact with each other.

There is a plurality of drawing rolls and a plurality of leather-covered rolls on each shaft therefor, as is well understood, and generally these shafts and rolls are driven and operate in the manner common to such shafts and rolls in machines of this character.

Each roll 17 has the customary corrugated peripheral part as represented at 18. At one end the roll 17 is provided with a hub 19. In the periphery of the hub 19 are four (more or less) angular recesses 20—see particularly Figs. 2 and 3. One side of each recess is approximately radial to the axis of the roll 17, and such side is at the end of the recess which is behind the direction of rotation of said roll. Within the hub 19 is an annular chamber 21 which opens into the bore therein for the shaft 16, and in said chamber is a spring 22. The spring 22 does not form a complete annulus, or, in other words, the longitudinal edges of said spring are separated to an appreciable extent. Projecting inwardly from one of the longitudinal edges of the spring 22, and extending into a properly positioned radial slot in the shaft 16, is a bent part of said spring 23. By means of the part 23 the spring 22 is attached to the shaft 16 in a manner to carry said spring around with said shaft when the latter revolves. The spring is held under compression in the chamber 21, and exerts sufficient force on the wall of said chamber, or, to state it differently, there is sufficient frictional resistance between said spring and the roll 17, to cause said roll to be rotated with the shaft 16, unless the roll be held against rotation with sufficient force to overcome the force of such frictional resistance. A spacer 128 separates the adjacent rolls 17.

The roving or thread, a length of which is represented at 24 in Fig. 1, passes over the first, second, and third drawing rolls, beneath the associated leather-covered rolls, and is fed thereby to the bobbin (not shown) in the usual manner, being stretched between the first and second drawing rolls and between the second and third drawing rolls by reason of the fact that each roll in the order named has a surface speed that is a little greater than the surface speed of the one behind.

From the third drawing roll 7 the roving 24 passes to and downwardly through an eye 25 at the front end of a thread-guide 26. It is after passing through the eye 25 that the roving arrives at the bobbin of which mention has been made and upon which the roving is wound. The thread-guide 26 is supported by a normally horizontal arm 27, which arm has at the front terminal a lug 28 to receive said guide. A set-screw 29 is tapped into the underside of the arm 27 to engage the thread-guide 26 and hold the same securely in place. Upon loosening the set-screw 29 the thread-guide may be adjusted longitudinally to whatever extent necessary, after which said screw is retightened. The arm 27 adjacent to its rear end is pivoted, as at 30, to an approximately vertical carrier 31, adjacent to the upper end of said carrier. Normally the arm 27 assumes an approximately horizontal position by gravity and with the aid of a pin 32 that projects laterally from said arm in front of the carrier 31. The arm 27 is free, however, to be rocked upwardly on the pivot 30. Loosely mounted in the arm 27, back of the pivot 30 and close to the rear end of said arm, is an inverted U-shaped link 33. The free terminals of the link 33 are extended horizontally in opposite directions to form lugs 34—34. The arms of the link 33 extend some distance below the arm 27.

Figure 6:
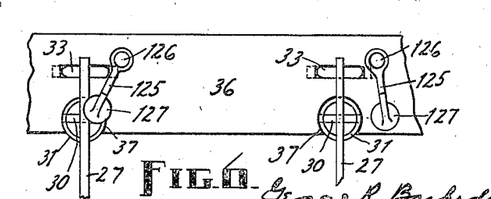
Fig. 6, an enlarged top plan of certain of the thread-guide-carrying members and of locking members associated therewith.
Figure 7:
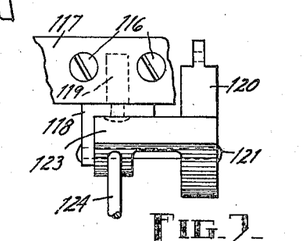
Fig. 7, an enlarged detail, in top plan, of the stop device for the first drawing roll, including portions of the support for such device.

Secured by means of screws, one of which is represented at 35, to the front face of the angle-iron 2 and parallel therewith is a horizontal angle-iron 36. The front edge of the angle-iron 36 is recessed, as best shown at 37 in Fig. 6, to receive and serve as a guide for the carrier 31 at its upper terminal, said carrier in the present example being a tubular member, and the recess being of a size and shape to accommodate the carrier without interfering with whatever motion may be imparted to the same. The lower terminal of the carrier 31 is pivoted at 38 to the front terminal of a counterweighted, balancing lever 39.

Figures 4, 5:
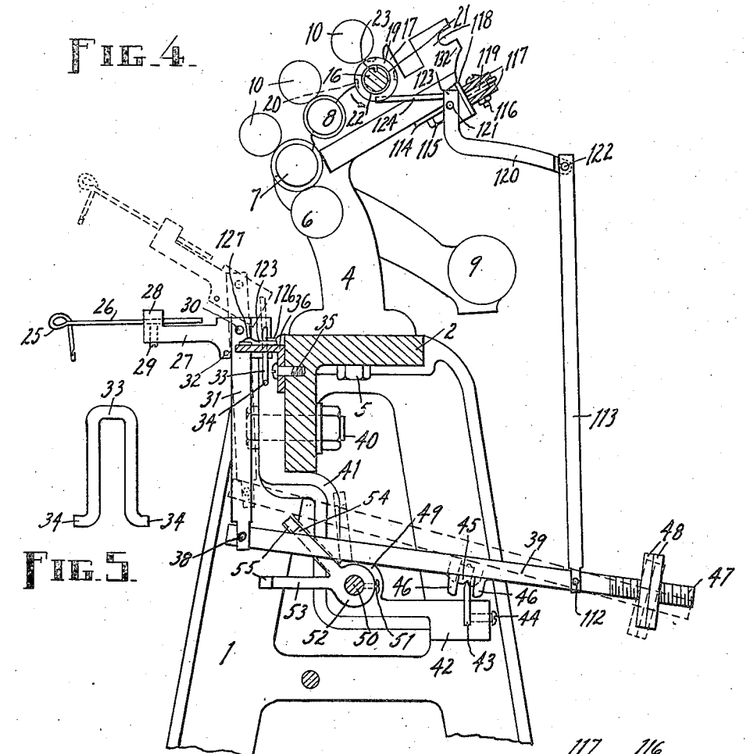
Fig. 4, a side elevation similar to Fig. 1, except that the operating parts and members are differently disposed in order to illustrate the operation of the check.
Fig. 5, an enlarged front elevation of a link for tilting the thread-guide arm for doffing.

Bolted at 40 to the angle-iron 2 is a bracket 41. The bracket 41 extends downwardly, from the angle of the angle-iron 36, in front of the angle-iron 2, rearwardly beneath the vertical portion of said last-named angle-iron, and then downwardly again, and finally rearwardly once more, to form a supporting arm 42 in which is set a knife-edge, fulcrum member or bearing 43, substantially as shown in Figs. 1 and 4. The bearing 43 is a vertical member which is set in the arm 42 near the rear end of said arm, and rises above the top of the same. A set-screw 44 is tapped into the rear end of the arm 42 to assist in securing the bearing 43 in place. Said bearing is usually made of hardened or tool steel. The lever 39 is provided on the underside intermediate of its ends with a notched bearing-block to receive, rest, and rock on the knife edge of the bearing 43, and with depending lugs 46—46 in front of and behind said bearing-block to prevent entire disengagement of the parts when said lever is rocked or tilted upwardly into its highest position, by the means and in the manner hereinafter described. The rear terminal portion of the lever 39 is screw-threaded at 47 to receive one or more counterweights 48. These counterweights exert more or less counteracting action to that produced by the members connected with the front terminal of the lever 29, and the intact roving 24 which passes through the eye 25, and causes a downward pressure to be exerted on the forward end of said lever, accordingly as said counterweights be adjusted on the screw-threaded part 47 rearwardly or forwardly.

The bracket 41 is provided, in the junction between the arm 42 and the part of said bracket that extends upwardly from the front end of said arm, with a bearing 49, and journaled in such bearing in this (and the other bearings with which the other brackets are provided) is a rock-shaft 50 that extends the entire length of the machine, and in the present case beyond the upright 1 at one end of said machine—see Figs. 8, 9, and 10. Secured to the rock-shaft 50 adjacent to the lever 39, by means of a set-screw 51, is a hub 52 which has projecting in a generally forwardly direction therefrom a lower arm 53 and an upper arm 54. Projecting laterally from the forward terminal of each of the arms 53 and 54 is a lug 55, the lower lug extending beneath and the upper lug above the lever 39. Also secured to the rock-shaft 51, by means of a set-screw 56, is an arm 57 that extends forwardly from said shaft.

It is assumed that the portion of the rock-shaft 50 which projects beyond the end of the frame of the machine is at the right-hand end of said machine as viewed from the front or delivery side thereof, such being the case, the plans which constitute Figs. 8 and 9 are presentations of the parts therein illustrated as viewed from a position in the rear of the machine looking down. Secured to this projecting portion of the rock-shaft 50, in the order named from the adjacent upright 1 outwardly, are a sheave 59, and a sheave 60. Passing over the sheave 59 and having one end secured thereto is a cord 61 or equivalent member. The cord 61 has a part that extends downwardly in front of the sheave 59, and a counterweight 62 is attached to the lower end of such part of said cord. Passing forward from the underside of the sheave 60 and having one end secured thereto is a cord 63. A pin 64 projects from the rock-shaft 50 in a generally downwardly direction, said pin being located near the arm 57.

A horizontal hook or latch 65 has its front terminal pivotally attached at 66 to a lug 67 on the upright 1 at the end of the machine where the sheaves 59 and 60 are located. The latch 65 is so positioned that, under conditions hereinafter to be explained, the pin 64 may be engaged by the rear terminal of said latch.

A bracket arm 68 extends beyond the right-hand end of the frame of the machine, which is the end last above referred to, the inner end of said arm having a lug that is bolted at 69 to the upright 1 at the aforesaid end of the frame, and being further supported by a brace 70 that is bolted at 71 to the underside of said arm and at 72 to the side of said upright to which the arm is bolted. An idler or sheave 73 is mounted on a stud 74 which projects from an inclined boss 58 on the arm 68 behind the sheave 60, and the cord 63 passes from the underside of said second-named sheave to said first-named sheave and partly around the same in a direction away from the adjacent upright 1. Attached to the outer end of the cord 63 is a spring 75. The opposite or outer end of the spring 75 is attached at 76 to the inner end of a bar 77. The bar 77 is mounted on the arm 68 in lugs 78—78 that rise from said arm, and said bar is adapted to slide longitudinally on the arm in said lugs. Mounted to slide longitudinally on the arm 68 in lugs 79—79 is a second bar 80, the same being in line with the bar 77. Extending rearwardly from the bar 80 is a bifurcated shipper arm 81 that is in position to engage the belt 14 and shift the same from the pulley 12 to the pulley 13 and back again, when said bar is actuated in its lugs on the arm 68. A lever 82, for the belt shipper, which latter comprises the bar 80 and the arm 81, has its rear terminal pivotally connected at 83 with a rearwardly-extending lug 84 on the arm 68 at the outer terminal thereof. The lever 82 has a longitudinal slot 85 therein, and a pivot pin 86 rises from the bar 80 at the outer terminal thereof and enters said slot. At the forward end of the lever 82 is an upwardly-extending handle 87.

When the lever 82 is rocked on the pivot 83 in the direction to move the pivotally-connected bar 80 inwardly, the belt 14 is shifted by the arm 81 from the pulley 12 to the pulley 13, and then when said lever is rocked on said pivot in the opposite direction, said belt is shifted by said arm from said pulley 13 to said pulley 12.

Journaled in the frame of the machine below the horizontal plane of the rock-shaft 50, but somewhat in advance of the vertical plane of said shaft, is a shaft 88 which has a screw-threaded section 89. The shaft 88 is driven from the main shaft 11 through the medium of a pulley 129 on said main shaft, a pulley 130 on said first-named shaft, and a belt 131 which passes over said pulleys, or from some intermediate shaft. An angular bracket 90 projects rearwardly and downwardly from the bar 77, and terminates at the base in a sleeve 91 which encircles the screw-threaded part of the shaft 88. A latch 92 is pivotally connected intermediate of its ends at 93 to the sleeve 91 on the underside thereof, and said latch is provided at the outer end with one or more teeth 94 which are adapted to engage the screw-threads 89. A spring 95 is interposed between the bottom of the sleeve 91 and the inner terminal or tail of the latch 92, and has a constant tendency to rock said latch on the pivot 93 in such a manner as to cause the teeth 94 to engage the screw-threads 89. Extending downwardly and outwardly from the latch 92 is an arm 96, and extending forwardly from the free terminal of such arm is a stud 97 on which an anti-friction roll 98 is mounted.

Extending rearwardly from the brace 70 is a lug 99 and secured to the back side of said lug is a cam plate 100. The plate 100 is provided on the back side with flanges or tracks 101 and 102 to form paths for the guidance of the roll 98, the track 102 having pivotally connected therewith a yielding member or trip 103. The track 101 has a horizontal part at the upper edge of the plate 100, extends downwardly at the inner edge of said plate, and has a downwardly and outwardly curved portion which finally extends downwardly again at the outer edge of said plate, as best shown in Fig. 12. The track 102 is below and parallel with the horizontal part of the track 101, and the inner end of the trip 103 is pivotally connected at 104 to the outer end of said first-named track. The outer end of the trip 103 is adapted to contact with the convex portion of the track 101, and is limited in its upward movement by such portion. A spring 105, which is coiled around the pivot 104 and has one end bearing beneath a pin 106 that projects rearwardly from the track 102 and the other end bearing beneath a pin 107 that extends rearwardly from the trip 103, exerts a constant tendency to swing said trip upwardly into engagement with the aforesaid convex portion of the track 101 and to maintain it in such engagement. When the trip 103 is in normal position the underside of the same is in line with the underside of the track 102. Sufficient space is left between the vertical part of the track 101, at the inner end of the plate 100, and the adjacent end of the track 102 to permit the roll 98 to pass between said vertical part and said end. Likewise, the trip 103 may be opened sufficiently to permit said roll to pass downwardly between the compound-curved portion of said first-named track and the adjacent end of said second-named track, as shown in broken lines in Fig. 12. After the roll 98 passes downwardly past the trip 103, said roll must continue downwardly and forwardly into the position indicated by broken lines at 108, to enable said trip to be actuated into closed position again by the spring 105. An approximately straight and substantial path or guide for the roll 98 is thus provided from the most advanced position taken by said roll 98 inwardly to the space between the inner end of the track 102 and the adjacent vertical part of the track 101. While the roll 98 is traveling inwardly beneath the trip 103 and the track 102, the latch 92 is retained with the teeth 94 out of engagement with the screw-threads 89, but, when said roll arrives at the inner end of the track 102 and passes beyond such end, the spring 95 acts to rock said latch in such a manner as to swing the forward end of the latch upwardly and cause the teeth 94 to engage with said screw-threads. The roll 98 is now in contact with the horizontal part of the track 101, and, when said roll is carried outwardly, it travels in the space above the track 102 until it arrives at the trip 103, thus retaining the teeth 95 in engagement with the screw-threads 89. Upon arriving at the compound-curved portion of the track 101, the roll 98 follows such portions of said track until said roll is in the position indicated at 108. Meanwhile the trip 103 is actuated, against the resiliency of the spring 105, out of the way of the roll 98, or in such a manner as to enable said roll to pass by the free end of said trip, and the latter is returned by said spring to normal position. At this time the latch 92 is actuated, against the resiliency of the spring 95, and the teeth 94 are withdrawn from engagement with the screw-threads 89. The movement of the roll 98 in one direction is limited by the vertical part of the track 105 at the outer end of the plate 100, and in the other direction by the vertical part of said track at the inner end of said plate.

Extending between a pin 109, which rises from the inner lug 79 on the arm 68, and a pin 110, which rises from the bar 77 adjacent to the outer end thereof, is a spring 111. The spring 111 is stronger than the spring 75.

When the arm 82 is actuated in the direction to ship the belt 14 from the pulley 12 to the pulley 13, the bar 77, now in contact at its outer end with the inner end of the bar 80, is actuated inwardly and carries with it the sleeve 91, with the latch 92 which is out of engagement with the screw-threads 89, as previously explained. The belt 14 now being on the loose pulley 13, the shaft 88, with the other parts of the machine driven from the shaft 11 ceases to revolve. As the bar 77 moves inwardly, the cord 63 permits the counterweight 62 to descend and thus partially to rotate the rock-shaft 50 in the direction to actuate the arm 54 downwardly, the amount of movement being sufficient to carry the lug 55 on said arm into engagement with the lever 39, as indicated by broken lines in Fig. 1, thus preventing said lever from swinging upwardly at the forward terminal. The limit of the inward movement of the parts is fixed by the inner lug 78 which is in the path of the bracket 90. It is at this time that the latch 92 is caused to engage the screw-threads 89 on the now idle shaft 88.

Upon swinging the arm 92 in the direction to actuate the belt 14 onto the driving pulley 12, the bar 80 is caused to draw away from the bar 77, against the resiliency of the spring 111, and the parts and members, including the shaft 88, which are driven from the shaft 11 are set in motion. The revolving shaft 88 now slowly actuates the bar 77 outwardly, through the medium of the screw-threads 89, the teeth 94, the latch 92, the sleeve 91, and the bracket arm 90, until the roll 98 descends past the trip 103, when said teeth are disengaged from said screw-threads. The spring 111 now acts to draw the bar 77 into contact with the bar 80. The movement imparted by the spring 111, after the latch 92 has become disengaged from the screw threads 89, is necessary in order to cause the roll 98 to clear the trip 103 and enable the latter to resume its normal or closed position and complete or restore the lower track guide. The movement outwardly of the bar 77, brought about by the latch engagement with the screw-threads on the revolving shaft 88 and by the spring 111, causes the rock-shaft 50, through the medium of the spring 75, the cord 63, and the sheave 60, to be partially rotated in the direction to raise the arm 54, and thus release the lever 39 so that it is free to move upwardly at the forward end. The spring 75 must, of course, be of sufficient strength partially, through the medium of the cord 63, to revolve the sheave 60 and with said sheave the rock-shaft 50, overcoming the force exerted by the counterweight 62 and causing the same to be elevated by the cord 61 attached to the sheave 59 on said shaft. Thus it is seen that the lever 39 is automatically locked, so far as upward movement at the forward end is concerned, when the machine is inactive, and automatically unlocked, so that such movement can take place, when the machine is started.

In the event the teeth 94 do not properly engage the screw-threads 89, when the latch 92 is first released to the spring 95, the latter causes full and complete engagement to take place as soon as the shaft 88 begins to revolve.

The lever 57 is provided for the purpose of actuating the rock-shaft 50 to tilt the arm 27 with the thread-guide 26 into the position shown by broken lines in Fig. 4, through the medium of the arm 53 with its lug 55, and the carrier 31, at the time the full bobbins are removed and replaced with empty bobbins, or during what is known as the doffing operation. At this time the machine is idle or the moving parts thereof are at rest, and the lever 57 is grasped and swung upwardly, carrying with it the rock-shaft 50 far enough to enable the latch 65 to be engaged with the pin 64. The rock-shaft is then locked in position by the latch 65 and the lever 57 released. It will be remembered that, upon the shifting of the belt onto the loose pulley, the rock-shaft 50 was actuated to carry the arm 54 downwardly into locking engagement with the lever 39, consequently it is now necessary, in order to raise said lever with the lug 55 on the arm 53, to impart to the rock-shaft sufficient movement, not only to remove the arm 54 from locking position relative to said lever, but also to swing said lever 53 upwardly to the extent required. Without the spring 75, the necessary movement could not be imparted by the arm 75 to the rock-shaft 50, but said spring yields sufficiently to enable the desired result to be attained. The lug 55 on the arm 53 first comes into contact with the underside of the lever 39, and then swings said lever upwardly on a pivot 112 which connects a link 113 with said lever, the bearing-block 45 rising off of the bearing 43. As the carrier 31 is elevated by the lever 39, it takes with it the arm 27. The arm 27 remains in an approximately horizontal position until the lugs 34 of the link 33, which link is carried by said arm, encounter the underside of the horizontal part of the angle-iron 36, when further upward movement of said link is checked, and the latter causes said arm to be rocked, on the pivot 30, upwardly at the front end, thus locating the arm and the thread-guide 26 in a position where they do not interfere with or obstruct the doffing operation. At the end of the doffing operation, the arm 57 is grasped and forced upwardly a little to enable the latch 65 to be swung away from the pin 64, and then said arm is permitted to descend into its former position, and the rock-shaft 50, with the parts and members carried thereby, is returned to its former position, through the influence or action of the spring 75. The spring 75 must be powerful enough to act through the cord 63 and the sheave 60 partially to rotate the rock-shaft 50 and elevate the counterweight 62, without the aid of downward pressure on the arm 57. The return movement of the rock-shaft 50, under the force of the spring 76, causes the lever 39 to be relocked by the arm 54.

The lugs 46 prevent the lever 39 from becoming altogether disengaged from the bearing 43, when said lever is swung upwardly on the pivot 112 for doffing purposes, and, when said lever is swung downwardly on said pivot after said operation, said lugs assist in guiding the bearing-block 45 to place again on said bearing. Upon the downward movement of the lever 39, after the doffing operation, the carrier 31 descends with the arm 27 and the link 33, until said arm assumes its former position, the arm swinging downwardly on the pivot 30 until the stop pin 32 encounters said carrier, as said link descends and the lugs 34 thereon pass below the horizontal part of the angle-iron 36.

A supporting arm 114 is bolted at 115 to the underside of the upper, rearwardly-extending part of the stand 4, and bolted at 116 to said arm, and to similar arms with which the other stands are provided, are upper and under bars 117—117. An angular bracket 118 has a rearwardly-extending lug 119 that is clamped between the bars 117, and may be adjusted lengthwise of said bars, such adjustment being required in order to accommodate the parts carried by said bracket to the first drawing roll 17. A bell-crank-lever 120 is pivotally connected at 121 with the forwardly-extending part of the bracket 118. The bell-crank-lever 120 has one arm which extends rearwardly and is pivotally connected at 122 with the upper terminal of the link 113, and also has a head 123 one end of which is contiguous with the aforesaid forwardly-extending part of the bracket 118. Extending forwardly from the head 123 is a finger 124. The construction and arrangement of parts are such that the forward or free end of the finger 124 may be thrust into any of the recesses 20 in the hub 19 of the drawing roll 17.

Normally the counterweights 48 are so adjusted on the screw-threaded part 47 of the lever 39 that said lever is maintained in an approximately horizontal position, with the top of the rear-end portion of the arm 27 approximately on a level with the top of the angle-iron 36, while the roving 24 is being wound on the bobbin, by the slight force, pressure, or downward pull exerted by said roving in its passage through the thread-guide eye 25. As the thread 24 is drawn through the eye 25, there is produced a slight vibration or reciprocation of the parts including the carrier 31, and a corresponding vibration or oscillation of the lever 39. With the lever 39 in the position just described, the stop finger 124 is positioned out of contact with the drawing-roll hub 19, by the link 113 and the bell-crank-lever 120, and the clearance between said finger and said hub is sufficient to enable said lever to vibrate or oscillate, in the manner of which mention has just been made, without causing the finger to contact with the hub. The arm 53 is positioned approximately horizontally by the parts and members controlling the rock-shaft 50, and with its lug 55 a sufficient distance below the lever 39 to offer no interference to the aforesaid oscillation of said lever, although fixing a limit to the downward movement of the lever at the front end.

If the roving 24 breaks at any point between the first drawing roll 17 and the bobbin, the force exerted by said roving on the thread-guide 26 is interrupted, discontinued, or removed, the counterweights 48 cause the lever 39 to carry the rear end of said lever downwardly, said lever rocking on the bearing 43, and the link 113 is drawn downwardly with said rear end of the lever, and takes with it the rear terminal of the bell-crank-lever 120, the latter rocking on the pivot 121, with the result that the head 123 of said bell-crank-lever is thrown rearwardly until it contacts with the back part of the bracket 118, and the free terminal of the finger 124 is thrust into engagement with the hub 19 and practically instantly enters one of the recesses 20, thus arresting further movement of the drawing roll 17. The rotation of the roll 17 is arrested because said roll is held by the finger 124 against the force exerted thereon by the spring 22, and the latter is carried around with the shaft 16 without said roll. The roving 24, if it did not break in the first instance between the first and second drawing rolls, is caused now to break at that point. This is due to the fact that the second drawing roll 8 continues to function after the first drawing roll 17 has ceased to function, and the roving is pulled apart between the two rolls. In the event the roving breaks initially between the second and third or first and second drawing rolls, the stop mechanism does not operate until the roving in the bite of the drawing rolls has been passed clear of the same, but when the initial break occurs forward of the third drawing roll the stop mechanism operates immediately.

The break in the roving must now be repaired, and in order to do this it is first necessary to press down the carrier 31 until the top of the same is flush with the top of the angle-iron 36, to cause the lever 39 to be rocked on the member 43 in the opposite direction to that in which it was rocked as the result of the breaking of the roving, and thus elevate the link 113 and the rearwardly-extending part of the bell-crank-lever 120 to withdraw the finger 124 from the hub 19. This restores the control of the drawing roll 17 to the spring 22, and enables said roll to resume its rotation and normal function, and the roving is delivered by said roll to the second drawing roll 8, and by the latter to the third drawing roll 7. The roving from the bobbin is passed upwardly through the eye 25 and united with the roving being delivered by the drawing rolls. The spinning operation is now resumed.

There are instances in which the roving becomes wrapped around the leather-covered roll 10 which is associated with the the third drawing roll 7, and then it becomes necessary for the operator to remove such roving. For this and other reasons it is desirable, not to say necessary, to provide a lock for the carrier 31 so that the same can be held mechanically after being pressed down with the finger, thus leaving free the operator's hand that otherwise would be engaged in holding down the carrier. To this end a button 125 is mounted on the angle-iron 36 and pivotally connected therewith at 126. The button 125 has a head 127 that may be positioned over the upper edges of the carrier 31 and arm 27, when said carrier is pushed downwardly with the finger until said edges are flush with the top of the angle-iron 36. After the roving has been repaired, the button 125 is actuated out of engagement with the carrier 31, and said carrier and the connected parts and members are again left to the control of the roving as the spinning operation proceeds.

When the machine is shut down, the roving becomes slack and there is a tendency for the carrier 31 to move upwardly under the influence of the counterweights 48, which action would cause the drawing roll 17 to be locked by the finger 124. Obviously, if the roll 17 were thus prevented from rotating with the shaft 16 when the machine is again started, the roving 24 would be broken between said roll and the second drawing roll. Such a result would be fatal to the success of our invention. We, however, prevent such a disastrous result by making provision for locking the lever 39 with the arm 54, in the manner and by the means hereinbefore explained, to prevent the finger 124 from approaching the roll 17. The retarding means, which includes the screw-threaded shaft 88 and the latch mechanism associated therewith, affords the time needed for the revolving parts of the machine to get under way properly before the balanced operating mechanism for arresting the movement of the first drawing roll is unlocked. Consequently there is no liability of interfering with the rotation of the first drawing roll too early in the operation of the machine.

The mechanism associated with the thread-guide illustrated in the last four views of the drawings, comprises fewer parts and is less expensive than that hereinbefore described, and for these reasons at least might be preferred. This mechanism takes the place of the carrier 31, the arm 27, the link 33, and the button 125, of the first construction, and will now be described.

In this case the lever 39 is provided at the front with an upright or support 133, which support extends through a slot 134 in the angle-iron 36. An arm 135 is pivotally connected at 136, adjacent to the rear terminal of said arm, with the support 133 at the upper terminal thereof, such upper terminal being cleft vertically to receive said arm, as is also the carrier 31 to receive the arm 27. A stop pin 137 is provided in the arm 135 in front of the support 133 to contact with said support and limit the downward movement of the front terminal of said arm. The arm 135 extends rearwardly beyond the support 133 to form a heel 138, and a portion of the horizontal part of the angle-iron 36, that is struck out to produce the slot 134, is bent upwardly and then forwardly over said heel to form a lug 139.

At the front end of the arm 135 is a sleeve 140, and the thread-guide 26 is received on top of said sleeve and there secured by means of an eye-bolt 141, through which said guide extends, and a nut 142. The eye-bolt 141 extends downwardly through the sleeve 140, and the nut 142 is screwed onto said eye-bolt below said sleeve, a washer 143 being interposed between said sleeve and said nut. By means of the eye-bolt 141 and the nut 142 any desired adjustment can be given to the thread-guide 26.

Normally the support 133 and the arm 135, through the medium of the lever 39, function in substantially the same manner as do the carrier 31 and the arm 27, the parts and members vibrating under the influence of the running roving.

Figures 13, 14:
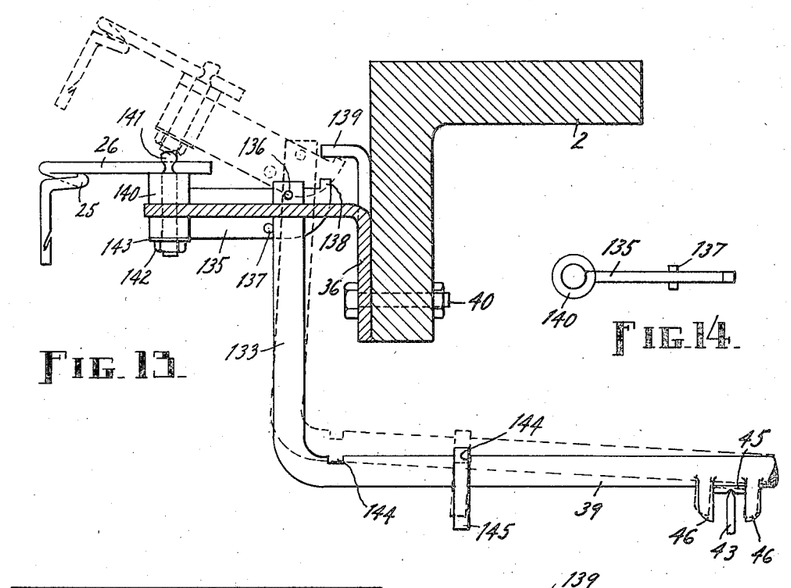
Fig. 13, an enlarged side elevation, with parts in section of a modified form of certain parts of the balanced mechanism of the check.
Fig. 14, a top plan of the thread-guide arm shown in the preceding view.
Figure 15:
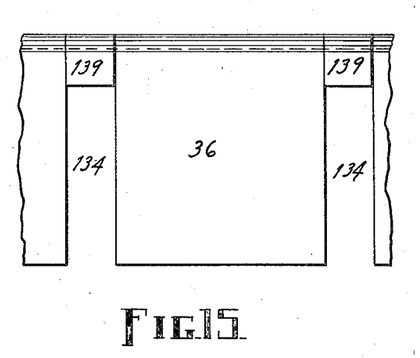
Fig. 15, a top plan of a portion of the angle-iron or support used in the modified construction, and, Fig. 16, a front elevation of a portion of said support.
Figure 16:
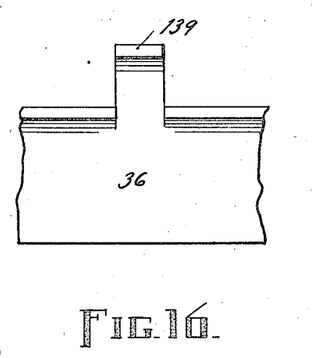

When the lever 39 is rocked upwardly at the front end for doffing, the arm 135 is carried upwardly by the support 133 until the heel 138 encounters the lug 139, and then, by reason of such contact or engagement, said arm is tilted upwardly into the position shown by broken lines in Fig. 13, thus taking the thread-guide 26 out of the way so that the filled bobbin can be removed without difficulty. After the doffing operation, the lever 39 is again swung downwardly at the front end, and the arm 135 with the thread guide assumes its normal position again.

Two notches 144 are formed in the lever 39 behind the support 133, and a ring 145 is provided and adapted to be positioned in either of such notches. Under normal conditions the ring 145 is positioned in the rear notch 144, and then the weight of said ring does not interfere with the necessary vibratory motion or action of the lever 39 and the parts and members carried by and supported from the upright 133 of said lever. When it is desired to hold down the support 133, with the arm 135 and the thread-guide 26, so that both hands of the operator may be free to "put up" the end of the roving, the ring 145 is moved from the rear notch 144 to the front notch 144, thus transferring the weight of said ring to a point where the front end of the lever 39 is held down. At the end of the "putting up" operation, the ring 145 should be moved back into the rear slot 144, but if the operator should forget to do this and proceed to raise the parts into doffing operation, said ring would not interfere with the throwing up of the lever 39 at the front end, and no harm would be done.

The outside diameter of the sleeve 140 is approximately equal to the width of each slot 134, and such slot is long enough to receive said sleeve, as well as the support 133 that carries the arm 135 of which the sleeve is a part, consequently said support is guided vertically by the angle-iron 36, except when said arm is swung up into doffing position. In the latter case application of the lug 55 of the arm 53 to the underside of the lever 39, and the engagement of the heel 138 with the lug 139, overcome the tendency, if any, on the part of the support 133 to leave the perpendicular.

What we claim as our invention, and desire to secure by Letters Patent, is—

1. In an automatic roving check, means controlled by the roving after it passes the third drawing roll to cause said roving to break between the first and second drawing rolls in the event the roving first breaks after passing said second drawing roll.

2. In an automatic roving check, means controlled by the roving to arrest the rotation of the first drawing roll only, in the event the roving breaks after leaving said roll.

3. The combination, in an automatic roving check, with the first drawing-roll shaft, a drawing roll on said shaft, and means normally to cause said roll to revolve with said shaft, but capable of permitting said roll when held by a superior force to remain stationary while the shaft revolves, of means controlled by the roving to cause said roll to be held against rotation when the roving breaks.

4. The combination, in an automatic roving check, with the first drawing-roll shaft, a drawing roll on said shaft, and friction means normally to cause said roll to be rotated with said shaft, of means controlled by the roving to cause said roll to be held stationary when the roving breaks.

5. The combination, in an automatic roving check, with the first drawing-roll shaft, a drawing roll on said shaft, and a resilient member between said shaft and said roll, said resilient member being secured to the shaft, of means controlled by the roving to cause said roll to be held stationary when the roving breaks.

6. The combination, in an automatic roving check, with the first drawing-roll shaft, a drawing roll on said shaft, and means normally to cause said roll to revolve with said shaft, but capable of permitting said roll when held by a superior force to remain stationary, while the shaft revolves, of balanced means controlled by the roving to cause said roll to be held against rotation when the roving breaks.

7. The combination, in an automatic roving check, with the first drawing-roll shaft, a drawing roll mounted thereon, and means normally to cause said roll to revolve with said shaft, but capable of permitting said roll when held by a superior force to remain stationary, of counterweighted means controlled by the roving to cause said roll to be held against rotation when the roving breaks.

8. The combination, in an automatic roving check, with the first drawing-roll shaft, a drawing roll mounted thereon, and means normally to cause said roll to revolve with said shaft, but capable of permitting the roll when held by a superior force to remain stationary, of counterweighted balanced means controlled by the roving to cause said roll to be held against rotation when the roving breaks.

9. The combination, in an automatic roving check, with the first drawing-roll shaft, a roll on said shaft, and means normally to cause said roll to rotate with said shaft, but adapted to be arrested by superior force applied to said roll, of means controlled by the roving to apply such force and cause said roll to be held against rotation when the roving breaks, said last-named means consisting in part of a member that is adapted to engage and release said roll, and means to lock said member in inactive relationship to said roll.

10. The combination, in an automatic roving check, with the first drawing-roll shaft of a machine of the class designated, a roll on said shaft, and means normally to cause said roll to rotate with said shaft, but adapted to be arrested by superior force applied to said roll, of means controlled by the roving to apply such force and cause said roll to be held against rotation when the roving breaks, said last-named means consisting in part of a member that is adapted to engage and release said roll, the starting and stopping mechanism of said machine, and means operated by said starting and stopping mechanism for causing said member to be locked in inactive relationship to said roll when said mechanism is actuated to stop the moving parts, and to release said member when said mechanism is operated to start said moving parts.

11. The combination, in an automatic roving check, with the first drawing-roll shaft, a roll on said shaft, and means normally to cause said roll to rotate with said shaft, but adapted to be arrested by superior force applied to said roll, of means controlled by the roving to apply such force and cause said roll to be held against rotation when the roving breaks, said last-named means consisting in part of a member that is adapted to engage and release said roll, means to lock said member in inactive relationship to said roll, and retarding means to release said member.

12. The combination, in an automatic roving check, with the first-drawing roll shaft of a machine of the class designated, a roll on said shaft, and means normally to cause said roll to rotate with said shaft, but adapted to be arrested by superior force applied to said roll, of means controlled by the roving to apply such force and cause said roll to be held against rotation when the roving breaks, said last-named means consisting in part of a member that is adapted to engage and release said roll, the starting and stopping mechanism of said machine, and means operated by said starting and stopping mechanism for causing said member to be locked in inactive relationship to said roll when said mechanism is actuated to stop the moving parts, and to release said member when said mechanism is operated to start said moving parts, said last-named means including mechanism for retarding the release of said member.

13. The combination, in an automatic roving check, with the first drawing-roll shaft, a drawing roll thereon, said roll having engaging parts, and means normally to cause said roll to be rotated with said shaft, but adapted to permit said roll to be arrested by superior force applied thereto, of a pivotally-mounted member adapted to be actuated into engagement with any of said engaging parts whereby the roll is held against rotation, and to be removed from such engagement, and means subject to the control of the roving for actuating said pivotally-mounted member into locking engagement with said roll when the roving breaks.

14. The combination, in an automatic roving check, with the first drawing-roll shaft, a roll mounted on said shaft, said roll having engaging parts, and a friction member attached to said shaft and adapted to bear against said roll and normally to cause the same to be rotated with said shaft, of a pivotally-mounted member adapted to be actuated into engagement with any of said engaging parts to hold said roll against rotation, and to be removed from such engagement, and means subject to the control of the roving for actuating said pivotally-mounted member into locking engagement with said roll when the roving breaks.

15. The combination, in an automatic roving check, with the first drawing-roll shaft, a roll mounted on said shaft, said roll having engaging parts, and a resilient member attached to said shaft and adapted to bear against said roll and normally to cause the same to be rotated with said shaft, of a pivotally-mounted member adapted to be actuated into engagement with any of said engaging parts to hold said roll against rotation, and to be removed from such engagement, and means subject to the control of the roving for actuating said pivotally-mounted member into locking engagement with said roll when the roving breaks.

16. The combination, in an automatic roving check, with the first drawing-roll shaft, a roll mounted on said shaft, said roll having engaging parts, and a resilient friction member attached to said shaft and adapted to bear against said roll and normally to cause the same to be rotated with said shaft, of a pivotally-mounted member adapted to be actuated into engagement with any of said engaging parts to hold said roll against rotation, and to be removed from such engagement, and means subject to the control of the roving for actuating said pivotally-mounted member into locking engagement with said roll when the roving breaks.

17. The combination, in an automatic roving check, with the first drawing-roll shaft, a roll mounted on said shaft, and means normally to cause said roll to be rotated with said shaft, but adapted to permit said roll to be arrested by the application thereto of a superior force, of a lever fulcrumed intermediate of its ends, and having a member rising from the front end thereof, a pivotally-mounted member adapted to engage and release said roll, a pivotal connection between said lever and said last-named member, and an arm provided with a thread-guide connected with said first-named member, the construction and arrangement of parts being such that when the roving breaks said lever is rocked in such a manner as to cause said member to engage and stop said roll.

18. The combination, in an automatic roving check, with the first drawing-roll shaft, a roll mounted on said shaft, and means normally to cause said roll to be rotated with said shaft, but adapted to permit said roll to be arrested by the application thereto of a superior force, of a lever fulcrumed intermediate of its ends and having a member rising from the front end thereof, a pivotally-mounted member adapted to engage and release said roll, a pivotal connection between said lever and said last-named member, an arm provided with a thread-guide connected with said first-named member, and a counterweight on said lever at the other terminal thereof, the construction and arrangement of parts being such that when the roving breaks said lever is rocked in such a manner as to cause said member to engage and stop said roll.

19. The combination, in an automatic roving check, with the first drawing-roll shaft, a roll mounted on said shaft, and means normally to cause said roll to be rotated with said shaft, but adapted to permit said roll to be arrested by the application thereto of a superior force, of a lever fulcrumed intermediate of its ends, and having a member rising from the front end thereof, a pivotally mounted member adapted to engage and release said roll, a pivotal connection between said lever and said second-named member, an arm pivotally connected with said first-named member, a thread-guide attached to said arm, and means to cause said arm to be tilted upwardly at the forward end when said lever is swung upwardly off of its normal pivotal support, the fulcrum of said lever then being changed from such support to said connection, but the construction and arrangement of parts being such that, when said lever is fulcrumed on said support and the roving breaks, the lever is rocked in such a manner as to cause said second-named member to engage and stop said roll.

20. The combination, in an automatic roving check, with the first drawing-roll shaft, a roll mounted on said shaft, and means normally to cause said roll to be rotated with said shaft, but adapted to permit said roll to be arrested by the application thereto of a superior force, of a lever fulcrumed intermediate of its ends, and having a member rising from the front end thereof, a pivotally-mounted member adapted to engage and release said roll, a pivotal connection between said lever and said member, an arm pivotally connected with said first-named member and provided with a thread-guide, said arm having a heel, means to limit the downward movement of the forward portion of said arm, and a fixed member in the path of said heel, the latter being adapted to engage said fixed member and cause said arm to be tilted upwardly at the front end, when said lever is lifted off of its normal pivotal support, the fulcrum of said lever then being transferred from such support to said pivotal connection, but the construction and arrangement of parts being such that, when said lever is fulcrumed on said support and the roving breaks, the lever is rocked in such a manner as to cause said second-named member to engage and stop said roll.

21. The combination, in an automatic roving check, with the first drawing-roll shaft, a roll mounted on said shaft, means normally to cause said roll to be rotated with said shaft, but adapted to permit said roll to be arrested by the application thereto of a superior force, a lever fulcrumed intermediate of its ends, and having a member rising from the front end thereof, a pivotally-mounted member adapted to engage and release said roll, a pivotal connection between said lever and said second-named member, and a thread-guide arm connected with said first-named member, the construction and arrangement of parts being such that when the roving breaks said lever is rocked in such a manner as to cause said second-named member to engage and stop said roll, of a rock-shaft provided with an arm to engage said lever and through the latter retain said second-named member in inactive position relative to said roll, and operating means for said rock-shaft.

22. The combination, in an automatic roving check, with the first drawing-roll shaft, a roll mounted on said shaft, means normally to cause said roll to be rotated with said shaft, but adapted to permit said roll to be arrested by the application thereto of a superior force, a lever fulcrumed intermediate of its ends, and having a member rising from the front end thereof, a pivotally-mounted member adapted to engage and release said roll, a pivotal connection between said lever and said second-named member, and a thread-guide arm connected with said first-named member, the construction and arrangement of parts being such that when the roving breaks said lever is rocked in such a manner as to cause said second-named member to engage and stop said roll, of a rock-shaft provided with an arm adapted to engage said lever and swing the same upwardly off of its normal pivotal support, the fulcrum of the lever then being changed from such support to said connection, whereby said arm is raised for doffing, and means for actuating said rock-shaft to bring about the aforesaid results.

23. The combination, in an automatic roving check, with the first drawing-roll shaft of a machine of the class designated, a roll mounted on said shaft, means normally to cause said roll to be rotated with said shaft, but adapted to permit said roll to be arrested by the application thereto of a superior force, a lever fulcrumed intermediate of its ends, and having a member rising from the front end thereof, a pivotally mounted member adapted to engage and release said roll, a pivotal connection between said lever and said second-named member, and an arm provided with a thread-guide connected with said first-named member, the construction and arrangement of parts being such that when the roving breaks said lever is rocked in such a manner as to cause said second-named member to engage and stop said roll, of a rock-shaft provided with an arm adapted to engage said lever and so lock the same that said member is held in inactive position relative to said roll, the stopping and starting mechanism of the machine and intervening mechanism between said rock-shaft and said first-named mechanism, whereby the rock-shaft is actuated to cause the lever to be locked when said first-named mechanism is shifted to stopping position, and to cause said lever to be unlocked when said first-named mechanism is shifted to starting position.

24. The combination, in an automatic roving check, with the first drawing-roll shaft of a machine of the class designated, a roll mounted on said shaft, means normally to cause said roll to be rotated with said shaft, but adapted to permit said roll to be arrested by the application thereto of a superior force, a lever fulcrumed intermediate of its ends, and having a member rising from the front end thereof, a pivotally-mounted member adapted to engage and release said roll, a pivotal connection between said lever and said second-named member, and a thread-guide arm connected with said first-named member, the construction and arrangement of parts being such that when the roving breaks said lever is rocked in such a manner as to cause said second-named member to engage and stop said roll, of a rock-shaft provided with an arm adapted to engage said lever and so lock the same that said member is held in inactive position relative to said roll, the stopping and starting mechanism of the machine, and intervening mechanism between said rock-shaft and said first-named mechanism, whereby the rock-shaft is actuated to cause the lever to be locked when said first-named mechanism is shifted to stopping position, and to cause said lever to be unlocked when said first-named mechanism is shifted to starting position, said second-named mechanism including means to cause the unlocking operation to be delayed after said first-named mechanism has set in motion the revolving parts.

25. The combination, in an automatic roving check, with the first drawing-roll shaft, a roll mounted on said shaft, means normally to cause said roll to be rotated with said shaft, but adapted to permit said roll to be arrested by the application thereto of a superior force, a lever fulcrumed intermediate of its ends, and having a member rising from the front end thereof, a pivotally-mounted member adapted to engage and release said roll, a pivotal connection between said lever and said second-named member, and an arm provided with a thread-guide connected with said first-named member, the construction and arrangement of parts being such that when the roving breaks said lever is rocked in such a manner as to cause said second-named member to engage and stop said roll, of a rock-shaft provided with an arm which is adapted to engage said lever, a member with which to actuate said rock-shaft in the direction necessary to cause said arm to raise the same from its normal fulcrum support and carry said thread-guide arm into position for doffing, the fulcrum of the lever then being transferred to said connection, and locking means for said rock-shaft when disposed as last mentioned.

26. The combination, in an automatic roving check, with the first drawing-roll shaft of a machine of the class designated, a roll mounted on said shaft, means normally to cause said roll to be rotated with said shaft, but adapted to permit said roll to be arrested by the application thereto of a superior force, a lever fulcrumed intermediate of its ends, and having a member rising from the front end thereof, a pivotally-mounted member adapted to engage and release said roll, a pivotal connection between said lever and said second-named member, and an arm provided with a thread-guide connected with said first-named member, the construction and arrangement of parts being such that when the roving breaks said lever is rocked in such a manner as to cause said second-named member to engage and stop said roll, of a rockshaft provided with arms one of which is adapted to engage said lever and so lock the same that said second-named member is held in inactive position relative to said roll, the stopping and starting mechanism of the machine, intervening mechanism between said rock-shaft and said first-named mechanism, whereby the rock-shaft is actuated to cause the lever to be locked when said first-named mechanism is shifted to stopping position, and to cause said lever to be unlocked when said first-named mechanism is shifted to starting position, a member with which to actuate said rock-shaft in the direction necessary to cause the other of said arms, which is also adapted to engage said lever, to raise the same from its normal fulcrum support and carry said thread-guide arm into position for doffing, the fulcrum of the lever then being transferred to said connection, and locking means for said rock-shaft when disposed as last mentioned.

27. The combination, in an automatic roving check, with the starting and stopping mechanism of a machine of the class designated, such mechanism consisting in part of a sliding bar, of a rock-shaft, a weight arranged to rotate said shaft in one direction, a flexible connection to rotate said shaft in the opposite direction, a second sliding bar to which said connection is attached, a spring between said second-named bar and a fixed part, said bars being in line with each other and said spring normally retaining said second-named bar in contact with said first-named bar, a shaft having a screw-threaded part, a sleeve carried by said second-named bar and encircling said screw-threaded shaft, a latch pivotally connected with said sleeve and having a tooth to engage the screw-threaded part of said shaft, said latch being provided with a cam-engaging member, a spring arranged normally to force said tooth into engagement with said screw-threaded part, and cam tracks for said cam-engaging member, whereby said latch is held out of engagement with said screw-threaded part when said sleeve travels with said second-named bar in one direction, and is held in engagement with said screw-threaded part while said sleeve travels in the opposite direction, said sleeve then being actuated by said screw-threaded part.

28. The combination, in an automatic roving check, with the starting and stopping mechanism of a machine of the class designated, such mechanism consisting in part of a sliding bar, of a rock-shaft, a weight arranged to rotate said shaft in one direction, a cord and spring adapted to rotate said shaft in the opposite direction, a second sliding bar to which said spring is attached, a second spring more powerful than the first between said second-named bar and a fixed part, said bars being in line with each other and said second-named spring normally retaining said second-named bar in contact with said first-named bar, a shaft having a screw-threaded part, a sleeve carried by said second-named bar and encircling said screw-threaded shaft, a latch pivotally connected with said sleeve and having a tooth to engage the screw-threaded part of said shaft, said latch being provided with a cam-engaging member, a spring arranged normally to force said tooth into engagement with said screw-threaded part, and cam tracks for said cam-engaging member, whereby said latch is held out of engagement with said screw-threaded part when said sleeve travels with said second-named bar in one direction, and is held in engagement with said part while said sleeve travels in the opposite direction, said sleeve then being actuated by said screw-threaded part, an arm on said rock-shaft wherewith to actuate the same in the direction to expand said first-named spring, and means to lock and release said rock-shaft from the position which it is caused to assume through the medium of said arm.

29. In an automatic roving check, a frame member, a bracket secured to said member, a bearing carried by said bracket, a lever mounted to rock on said bearing, and having a member rising from the front end thereof, a drawing-roll stop member pivotally connected with said lever, and a thread-guide arm connected with said second-named member.

30. In an automatic roving check, a frame member, a bracket secured to said member, a bearing carried by said bracket, a lever mounted to rock on said bearing, and having a member rising from the front end thereof, a drawing-roll stop member pivotally connected with said lever, a thread-guide arm connected with said second-named member, and a rock-shaft journaled in said bracket and provided with an arm which has a projection to engage said lever from above when and accordingly as said rock-shaft is operated.

31. In an automatic roving check, a frame member, a bracket secured to said member, a bearing carried by said bracket, a lever mounted to rock on said bearing, and having a member rising from the front end thereof, a drawing-roll stop member pivotally connected with said lever, a thread-guide arm connected with said second-named member, and a rock-shaft journaled in said bracket and provided with an arm which has a projection to engage said lever from below when and accordingly as said rock-shaft is operated.

32. In an automatic roving check, a frame member, a bracket secured to said member, a bearing carried by said bracket, a lever mounted to rock on said bearing, and having a member rising from the front end thereof, a drawing-roll stop member pivotally connected with said lever, a thread-guide arm connected with said second-named member, and a rock-shaft journaled in said bracket and provided with arms which have projections to engage said lever respectively from below and above the same when and accordingly as said rock-shaft is operated.

33. In an automatic roving check, a locking and releasing member for a drawing roll, an oscillatory lever having a member rising from the front end thereof, a pivotal connection between said first-named member and said lever, a thread-guide arm connected with said second-named member, and means to hold down said lever at the front end while the roving is being repaired.

34. In an automatic roving check, a locking and releasing member for a drawing roll, an oscillatory lever having a member rising from the front end thereof, a pivotal connection between said first-named member and said lever, a thread-guide arm connected with said second-named member, and a gravity member movably arranged on said lever adjacent to said second-named member, and capable of holding down said lever at the front end while the roving is being repaired.

35. In an automatic roving check, a first drawing-roll shaft, a drawing roll mounted on said shaft, said roll having engaging parts, and means normally to cause said roll to be rotated by said shaft, but adapted to permit said roll to be arrested by a superior force applied thereto, of a pivotally-mounted bell-crank-lever provided with a finger which is adapted to be thrust into engagement with any of said engaging parts and to be removed from such engagement, and operating means for said bell-crank-lever, such last-named means being subject to the control of the roving.

36. In an automatic roving check, balanced oscillatory roving-controlled means adapted to cause the first drawing roll to be arrested in its motion when the roving breaks, and means to lock said first-named means in such position that the same is prevented from exerting its influence on said roll.

37. In an automatic roving check, balanced oscillatory roving-controlled means adapted to cause the first drawing roll to be arrested in its motion when the roving breaks, means to lock said first-named means in such position that the same is prevented from exerting its influence on said roll, and retarding means whereby the release of said first-named means from said locking means is delayed.

38. In an automatic roving check, balanced oscillatory roving-controlled means adapted to cause the first drawing roll to be arrested in its motion when the roving breaks, such means consisting in part of an oscillatory lever and a pivotal connection, and means to tilt said lever in such a manner as to cause the same to be fulcrumed from said connection, for doffing purposes.

GEORGE R. BARKSDALE.
PAUL B. WILSON.

Witnesses:
J. L. CALHOUN,
W. B. LEAMAN.